Patented June 17, 1930

1,764,501

UNITED STATES PATENT OFFICE

HENRY BLUMENBERG, JR., OF MOAPA, NEVADA

PROCESS OF MAKING ALUMINUM CHLORIDE

No Drawing.   Application filed April 14, 1927. Serial No. 183,923.

My invention relates to a process of making aluminum chloride whereby the same may be produced in a simple, efficient and economic manner.

My process is based on the fact that when ammonium chloride or a chloride of the alkali metal or alkaline earth metal group is mixed with aluminum sulphate and heated a double decomposition takes place forming aluminum chloride and a sulphate of the alkali forming group.

When the heavier alkaline earth metal chlorides are used and a higher reaction temperature is required, I add to the mixture a reducing agent which will reduce aluminum sulphate to aluminum sulphide as an intermediate step in the process, the aluminum sulphide reacting more vigorously with the alkaline earth metal chloride to produce aluminum chloride. The temperature of the reaction is controlled in such a manner that the aluminum chloride is distilled off but the temperature is not high enough to distill the sulphate of the alkali forming group.

My invention consists of the steps of the process hereinafter described and claimed.

I use a chloride of the alkali metals in which I include ammonium chloride. I, in fact, prefer the latter for the reason that the reaction takes place at very low temperatures and the ammonium sulphate left as a residue in the retort may be again converted into ammonium chloride to enter another cycle of operations.

I take ammonium chloride and aluminum sulphate, preferably finely ground and intimately mixed, in the proportions indicated by the molecular weights in the following equation:

$$6NH_4Cl + Al_2(SO_4)_3 = Al_2Cl_6 + 3NH_4SO_4$$

and heat the same in a retort to a temperature of 200 to 300° C. The preferred temperature is 260° C. At a temperature of about 300° C. the ammonium sulphate formed as one of the products of the reaction begins to distill over with the aluminum chloride. Therefore the temperature should be maintained below this point so that the aluminum chloride only will distill over and may then be recovered in any suitable manner.

The other chlorides of the alkali metal group act similarly. However, they require somewhat higher temperatures. When a chloride of the alkaline earth metal is used, such as calcium chloride or barium chloride, a temperature from 600 to 700° C. is required to bring about the reaction forming aluminum chloride and the corresponding alkaline earth metal sulphate.

I have found that by the addition of 5 to 20 per cent of a reducing agent, such as carbon in the form of charcoal or carbonaceous matter including the hydrocarbon oils and naphthalene, the reaction temperature is lowered, which is due to the fact that the reducing agent will reduce the aluminum sulphate to aluminum sulphide which energetically combines with the chloride of the alkaline earth metal forming aluminum chloride.

Various changes may be made in the steps of the process by those skilled in the art without departing from the spirit of my invention as claimed.

In the claims the term alkali forming metal is intended to include ammonium ($NH_4$) which, as well known, is equivalent in its functions to potassium and sodium.

I claim:

1. A process of making aluminum chloride comprising heating a mixture of a chloride of an alkali forming group and aluminum sulphate to a temperature necessary to cause a double decomposition forming aluminum chloride and the sulphate of the alkali forming group by controlling the temperature of the reaction below the volatilization point of the sulphate of the alkali forming group so that aluminum chloride only will be distilled and recovering the aluminum chloride.

2. The process of making aluminum chloride comprising heating a mixture of ammonium chloride and aluminum sulphate to a temperature necessary to cause a double decomposition forming aluminum chloride and ammonium sulphate, controlling the temperature of the reaction below the volatilization point of the ammonium sulphate so that the aluminum chloride only will be distilled and recovering the aluminum chloride.

3. A process of making aluminum chloride comprising heating a mixture of ammonium chloride and aluminum sulphate to approximately 260° C. at which temperature a double decomposition forming aluminum chloride and ammonium sulphate will take place but the aluminum chloride only will distill over and recovering the aluminum chloride.

In testimony whereof I have signed my name to this specification.

HENRY BLUMENBERG, Jr.